United States Patent
Liu et al.

(10) Patent No.: US 11,707,017 B1
(45) Date of Patent: Jul. 25, 2023

(54) METHOD FOR IMPROVING SODA SALINE-ALKALINE PADDY FIELDS BY STIRRING AND DISCHARGING SLURRY AND APPLICATION THEREOF

(71) Applicant: Northeast Institute of Geography and Agroecology, Chinese Academy of Sciences, Changchun (CN)

(72) Inventors: Hongyuan Liu, Changchun (CN); Yanhong Zhou, Changchun (CN); Bolong Wen, Changchun (CN)

(73) Assignee: NORTHEAST INSTITUTE OF GEOGRAPHY AND AGROECOLOGY, CHINESE ACADEMY OF SCIENCES, Changchun (CN)

(*) Notice: Subject to any disclaimer, the term of this patent is extended or adjusted under 35 U.S.C. 154(b) by 0 days.

(21) Appl. No.: 17/965,134

(22) Filed: Oct. 13, 2022

(30) Foreign Application Priority Data

Apr. 24, 2022 (CN) .......................... 202210445638.0

(51) Int. Cl.
- A01C 21/00 (2006.01)
- A01C 23/00 (2006.01)
- A01C 23/02 (2006.01)
- A01G 25/16 (2006.01)

(52) U.S. Cl.
CPC .......... *A01C 21/005* (2013.01); *A01C 23/002* (2013.01); *A01C 23/027* (2013.01); *A01C 21/00* (2013.01); *A01G 25/16* (2013.01)

(58) Field of Classification Search
CPC ... A01C 21/005; A01C 23/002; A01C 23/027; A01C 23/00; A01C 23/02; A01C 21/00; A01G 25/16; A01G 25/00
See application file for complete search history.

(56) References Cited

U.S. PATENT DOCUMENTS

2007/0012080 A1   1/2007   Ashworth

FOREIGN PATENT DOCUMENTS

| CN | 102197725 A | 9/2011 |
|----|-------------|--------|
| CN | 202503891 U | 10/2012 |
| CN | 105052289 A | 11/2015 |
| CN | 106922240 A | 7/2017 |
| CN | 107896542 A | 4/2018 |
| CN | 110073756 A | 8/2019 |
| CN | 112889606 A | 6/2021 |
| CN | 113261404 A | 8/2021 |
| CN | 113261405 A | 8/2021 |
| KR | 20010002046 A | 1/2001 |
| SU | 1288196 A1 | 2/1987 |

*Primary Examiner* — Christopher J. Novosad
(74) *Attorney, Agent, or Firm* — Mayer & Williams, PC; Stuart H. Mayer

(57) ABSTRACT

A method for improving paddy fields by stirring and discharging slurry, including steps of rotary tillage scarifying, irrigation and paddy field soaking, slurry stirring, slurry layering, slurry discharging, airing, and water storing. The method for improving paddy fields by stirring and discharging slurry can quickly and greatly reduce soil salinity, with a cost lower than 1,000 yuan/hm2, a yield of 5,065 kg/hm2 to 6,304 kg/hm2; it saves the step of water harrowing before conventional rice planting and transplanting, and offers simple operation and promising prospect of replication and popularization, providing important support for increasing grain in soda saline-alkaline areas in the western Songnen Plain.

9 Claims, 2 Drawing Sheets

METHOD FOR IMPROVING SODA SALINE-ALKALINE PADDY FIELDS BY STIRRING AND DISCHARGING SLURRY AND APPLICATION THEREOF

CROSS-REFERENCE TO RELATED APPLICATIONS

This application claims priority to Chinese Patent Application No. 202210445638.0, filed on Apr. 24, 2022, the contents of which are hereby incorporated by reference.

TECHNICAL FIELD

The present disclosure belongs to the technical field of saline-alkaline paddy field improvement, and particularly relates to a method for improving soda saline-alkaline paddy fields by stirring and discharging slurry and application thereof.

BACKGROUND

There are about 3.4 million hectares ($hm^2$) of soda saline-alkaline land distributed in the western part of Songnen Plain in China, with high alkalinity (commonly indicated by pH), high exchangeable sodium percentage (ESP), high salinity, low permeability, and low nutrient availability; yet, such marginal land characterized by low yields has become a major area for implementing a production project of "50 billion kilograms (kg) of grain" proposed by Jilin Province in early 2022 in response to a Chinese national strategy of "transforming suitable saline land into arable land", where food security is at stake whether the grain production capacity of the soda saline-alkaline land can be improved rapidly. Although practical researches have proved that rice cultivation is an important way to utilize soda saline-alkaline land and is the only recognized agricultural production method that can effectively utilize heavy soda saline-alkaline land, in fact, without efficient soil improvement measures, the annual yield of rice cultivation in soda saline-alkaline fields from the first to the fourth year generally does not exceed 1,500, 3,000, 5,500, and 6,500 $kg/hm^2$, respectively; moreover, according to data of "minimum purchase price of rice in 2022" issued by the National Development and Reform Commission, which is 2.62 yuan/kg, in combination with a regional average cost of rice production and operation, which is 9,000 $yuan/hm^2$, the cumulative net profit and loss of rice planting in soda saline-alkaline land without soil improvement from the first year to the fourth year are −5,070 yuan, −6,210 yuan, −800 yuan, +7,230 $yuan/hm^2$, respectively, without considering land rent and farmers' labor input; in other words, it takes at least four years for farmers to start making profit from rice cultivation in soda saline-alkaline land, regardless of land rent and their own labor costs. The development and exploitation of soda saline-alkaline land is seriously hindered by the deficit in the previous period and the long period before making any profits.

Currently a common measure to rapidly improve the yield of soda saline-alkaline paddy fields is to apply salinity-reducing amendments, including flue gas desulfurization gypsum, phosphogypsum, calcium chloride and aluminum sulfate, etc.; however, the amendments for whichever type provide major effects include: (1) reducing ESP by replacing, through cation exchange, exchangeable sodium ions adsorbed by soil colloids (mainly clay particles in soda saline-alkaline soils with low content of organic matters); and (2) lowering alkalinity of the soil by reducing carbonate and bicarbonate ions in the soil through chemical reactions. For a paddy field with a 15-centimeter-thick cultivated layer of soil, and with a corresponding dry soil weight of about 2,000 tons per hectare ($t/hm^2$), a large amount of amendments needs to be applied to improve such a huge amount of soil so as to achieve a desired effect (in general, the first-year yield after improvement is 5,000 $kg/hm^2$-6,000 $kg/hm^2$); this explains why soda saline-alkaline paddy field improvement often involves several tons or even tens of tons of amendments, and the economic cost corresponding to this enormous amount of amendments input is more than ten thousands or even tens of thousands of yuan per hectare. According to the investigation results of the technical team of Black Soil Granary (Science and Technology Innovation Project of Black Soil Conservation and Utilization), the cost of improving soda saline-alkaline paddy fields in western part of Songnen Plain is mostly between 15,000 $yuan/hm^2$ and 40,000 $yuan/hm^2$, which is not only a high one-time investment, but also difficult to be recovered within two years. In general, most amendments are severely limited for wide application at such high costs.

The process of reducing soil's salinity and alkalinity in the tillage layer, whether by successive rice planting or by applying amendments, can be summarized into two sub-processes from the perspective of technical principles, including: (1) stripping saline and alkaline ions off the soil colloids; and (2) removing the stripped ions out of the tillage layer through drainage and infiltration. The main difference between the two approaches mentioned above is that the method of successive rice planting achieves stripping of saline and alkaline ions by diluting the soil solution with water over a long period of time, while the method of applying amendments achieves stripping by chemical reaction and ion exchange. In fact, the lengthy or costly improvement of soil is caused by the sub-process of "stripping" in the two-stage process of "stripping and removing"; moreover, judging from the perspective of the critical period, problems are almost exclusively confined to the first three years of rice field development and utilization. Based on the above analysis and combined with practical experience, it is necessary to develop a new method for improving soda saline-alkaline paddy fields by stirring and discharging slurry.

SUMMARY

Aiming at the above problems in the prior art, the present disclosure provides a method for improving paddy fields by stirring and discharging slurry; after in-depth analysis of the obstacles of soda saline-alkaline soil and current situation of soil improvement, the conventional concept of "stripping the saline and alkaline ions from the soil colloids and then discharging" is abandoned, and an idea of "the key to reduce the obstacles of soda saline-alkaline soil is clay particles with very low content" is developed, whereby the saline and alkaline ions are discharged and the soil is improved by mechanically stirring the slurry and discharging the clay particles from the paddy field in the form of a suspended slurry layer.

One of the aspects of the present disclosure provides a method for improving soda saline-alkaline paddy fields by stirring and discharging slurry, including:

S101: rotary tillage scarifying, where a soda saline-alkaline paddy field to be treated is scarified by rotary tillage with a depth of 11-14 centimeters (cm);

S102: irrigation and paddy field soaking, where the soda saline-alkaline paddy field treated in S101 is irrigated with water and soaked for 3-7 days, followed by supplementing with water to a thickness of 7 cm-10 cm before stirring;

S103: slurry stirring, where the slurry of the soda saline-alkaline paddy field is stirred in a clockwise or counter-clockwise direction;

S104: slurry layering, where a container containing 30 percent (%)-50% sulfuric acid by mass is mounted on a tractor, and the container is provided with a small hole to allow the sulfuric acid to continuously flow out of the container at a small flow rate; the tractor is started to stir the slurry so as to mix the sulfuric acid into the slurry, where soil silt particles in a suspended slurry layer precipitate rapidly, and soil clay particles remain in the slurry layer in a suspended state because of their smaller particles and stronger dispersibility; the stirring is carried out until most of the powder particles are precipitated and the suspended slurry layer is obviously reduced in terms of viscosity; the sulfuric acid used in this layering step is 70%-80% of a total amount of sulfuric acid of the method;

S105: slurry discharging, where water inlets and water outlets of the paddy field are opened while performing stirring, so that water replenishment and drainage can be carried out at the same time, and the suspended slurry layer is discharged out of the paddy field by using clear water flow; the stirring of the tractor is continued and the sulfuric acid left is sprinkled into the paddy field, where aroused waves are utilized to promote the suspended slurry layer to be discharged from the paddy field, and the tractor is stopped working until the sulfuric acid is all sprinkled into the field; the water inlets are closed until more than 95% of the suspended slurry layer is discharged, and the water outlets are kept open until the water in the paddy field is completely drained;

S106: airing, where airing is carried out when the soda saline-alkaline paddy field to be treated is a newly-reclaimed paddy field or a two-year paddy field, the paddy field is naturally aired until the water in the paddy field is drained and no slurry sticks to shoes when adults walk normally; and the airing is not carried out when the soda saline-alkaline paddy field to be treated is a three-year paddy field; and S107: water storing; for newly-reclaimed soda saline-alkaline paddy field to be treated, the field is watered until saturation with water of about 1 cm-2 cm 1 day before transplanting rice seedlings; and, for a two-year soda saline-alkaline paddy field to be treated, the field is watered until saturation with water of about 1 cm-2 cm 1-3 days before transplanting rice seedlings; and, for the three-year soda saline-alkaline paddy field to be treated, the field is watered until saturation directly after the slurry discharging of S105 is completed, the field is ready for transplanting.

The method for improving soda saline-alkaline paddy fields by stirring and discharging slurry achieves rapidly and significantly lowering soil's salinity and alkalinity at a cost of less than 1000 yuan per hectare (yuan/hm$^2$) and achieves a yield of 5,065 kilograms per hectare (kg/hm$^2$)-6,304 kg/hm$^2$; the present method saves a step of water harrowing before conventional rice transplanting, with simple operation and strong replicability, providing important support for increasing yield in the western soda saline-alkaline area of the Songnen Plain.

Watered until saturation in present disclosure refers to water the field until the water content of soil is saturated, with an area of surface water accounting for ¼-⅓ of that of the field.

In an embodiment of the present disclosure, in the step S101, when the soda saline-alkaline paddy field to be treated is a newly-reclaimed paddy field, the field is subjected to rotary tillage with a depth of 11-12 cm; and, when the soda saline-alkaline paddy field to be treated is a two-year paddy field, the field is subjected to rotary tillage with a depth of 12-13 cm; and, when the soda saline-alkaline paddy field to be treated is a three-year paddy field, the field is subjected to rotary tillage with a depth of 13-14 cm.

In an embodiment of the present disclosure, in the step S103, the slurry is stirred with a pulling force of no less than 80 kilowatts (kw).

In an embodiment of the present disclosure, in the step S103, the slurry is stirred by a driving slurry stirrer and a vibrating slurry lifter.

In an embodiment of the present disclosure, in the steps S104 and S105, when the soda saline-alkaline paddy field to be treated is a newly-reclaimed paddy field, the total amount of sulfuric acid is 1.0 ton per hectare (t/hm$^2$)-1.2 t/hm$^2$; and/or, when the soda saline-alkaline paddy field to be treated is a two-year paddy field, the total amount of sulfuric acid is 0.8 t/hm$^2$-1.0 t/hm$^2$; and/or, when the soda saline-alkaline paddy field to be treated is a three-year paddy field, the total amount of sulfuric acid is 0.6 t/hm$^2$-0.8 t/hm$^2$.

In an embodiment of the present disclosure, the water inlets in step S105 are arranged in a density of 4 to 6 inlets per hectare.

In an embodiment of the present disclosure, the water outlets in step S105 are arranged in a density of 4 to 6 outlets per hectare.

In an embodiment of the present disclosure, the water inlets and water outlets are arranged opposite to each other in a staggered manner.

Another aspect of the present disclosure provides an application of the method for improving soda saline-alkaline paddy fields by stirring and discharging slurry in improving saline-alkaline soil.

The present disclosure has the following beneficial effects:

the improved method adopts principle for improving soda saline-alkaline paddy field as follows: the saline and alkaline ions are mainly adsorbed on the soil colloids composed of mineral clay and humus; yet, the humus is in a small content in the barren soda saline-alkaline soil, thus the ions are mainly concentrated in the clay part of the soil; for instance, over 100 soil samples collected from Baicheng region, Jilin province of China are tested, with results showing that the soils are fine in texture, characterized by fine sand to silt, with not much clay particles; more than 95% of the soil samples have a clay content of less than 7%, indicating that, theoretically, by removing this 7% of the clay particles from the soil, the vast majority of the saline and alkaline ions in the soils can be removed; the clay particles in the soda saline-alkaline field adsorb a large amount of exchangeable sodium ions, making the clay particles extremely dispersible since sodium ions have large hydration radius; while applying the improved method, the slurry is stirred so as to make the clay particles of large amount form a suspended slurry layer, which is then discharged through the step of discharging, thus achieving the discharging of a large amount of clay particles and reducing salinity and alkalinity as well as improving soil.

DETAILED DESCRIPTION OF THE EMBODIMENTS

The present disclosure is further explained with reference to the following specific embodiments, but it does not constitute any limitation on the present disclosure.

Embodiment 1

Figure 2:
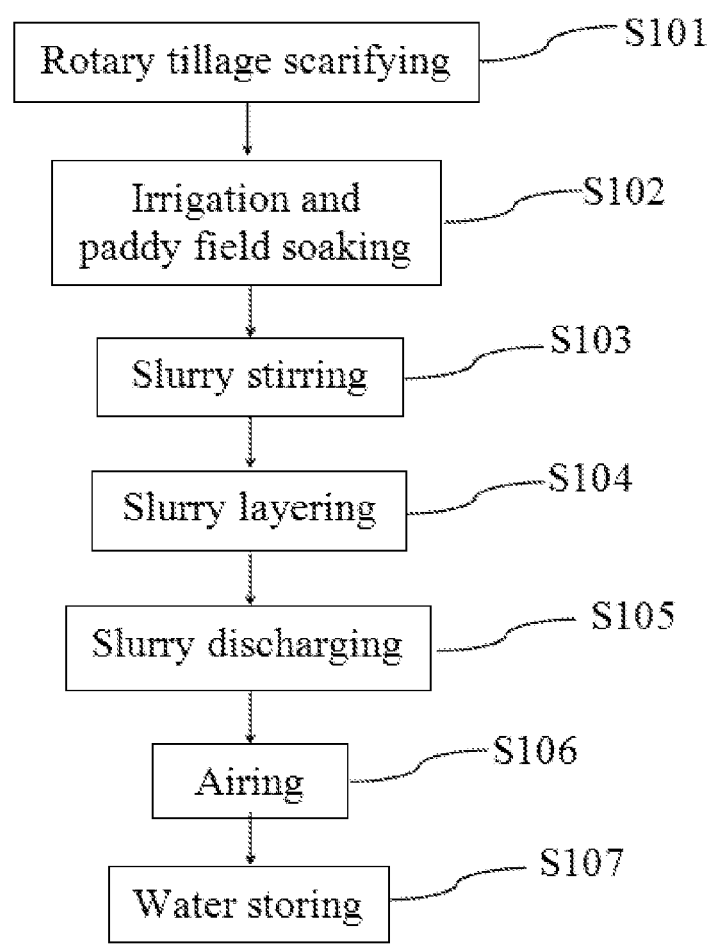
FIG. 2 is a process illustrating a method for improving soda saline-alkaline paddy fields by stirring and discharging slurry provided by the present disclosure.

The present embodiment is arranged with a newly-reclaimed experimental field in Dagangzi Town, Da'an City, Jilin Province, with a topsoil pH of 10.57, an electrical conductivity of 1.05 Siemens per centimeter (mS/cm), and an exchangeable sodium percentage (ESP) of 41 percent (%); the experimental field is improved according to a method for improving soda saline-alkaline paddy fields by stirring and discharging slurry provided by the present disclosure as shown in FIG. 2, including:

S101: rotary tillage scarifying, where a soda saline-alkaline paddy field to be treated is scarified by rotary tillage with a depth of 11.5 cm;

S102: irrigation and paddy field soaking, where the soda saline-alkaline paddy field treated in step S101 is irrigated with water and soaked for 5 days, followed by supplementing with water to a thickness of 9 cm before stirring;

S103: slurry stirring, where the slurry of the soda saline-alkaline paddy field is stirred by a driving slurry stirrer in a counterclockwise direction with a pulling force of 100 kilowatts (kw);

S104: slurry layering, where a container containing sulfuric acid of 30% by mass is mounted on a tractor, and the container is provided with a small hole to allow the sulfuric acid to continuously flow out of the container at a small flow rate; the tractor is started to stir the slurry so as to mix the sulfuric acid into the slurry, where soil powder particles in a suspended slurry layer precipitate rapidly, and soil clay particles remain in the slurry layer in a suspended state because of their smaller particles and stronger dispersibility; the stirring is carried out until most of the powder particles are precipitated and the suspended slurry layer is obviously reduced in terms of viscosity; the sulfuric acid used in this layering step is 75% of a total amount of sulfuric acid of this embodiment, and the total amount is 1.2 tons per hectare (t/hm$^2$);

S105: slurry discharging, where water inlets and water outlets of the paddy field are opened while performing stirring, so that water replenishment and drainage can be carried out at the same time, and the suspended slurry layer is discharged out of the paddy field by using clear water flow; the stirring of the tractor is continued and the sulfuric acid left is sprinkled into the paddy field, where aroused waves are utilized to promote the suspended slurry layer to be discharged from the paddy field, and the tractor is stopped working until the sulfuric acid is all sprinkled into the field; the water inlets are closed until 99% of the suspended slurry layer is discharged, and the water outlets are kept open until the water in the paddy field is completely drained; the water inlets are arranged in a density of 6 inlets per hectare, the water outlets are arranged in a density of 6 outlets per hectare, and the water inlets and the eater outlets are arranged opposite to each other in a staggered manner;

S106: airing, where the field is naturally aired until the water in the paddy field is drained and no slurry sticks to shoes when adults walk normally; and S107: water storing, the field is watered until saturation with water of 1 cm 1 day before transplanting rice seedlings after the field is drained and naturally aired.

In autumn, the field is measured in terms of yield; with improvement of stirring and discharging, the yield is measured to be 5,065 kilograms per hectare (kg/hm$^2$).

Comparative Embodiment 1

The present comparative embodiment is arranged with a newly-reclaimed experimental paddy field in Dagangzi Town, Da'an City, Jilin Province, with a topsoil pH of 10.57, an electrical conductivity of 1.05 mS/cm, and an ESP of 41%; the field is directly planted with rice without improvement of stirring and discharging; it is measured in terms of yield in autumn, with yield being only 402 kg/hm$^2$.

Embodiment 2

The present embodiment is arranged with a two-year experimental field in Dagangzi Town, Da'an City, Jilin Province, with rice planted directly in a previous year, a topsoil pH of 10.43, an electrical conductivity of 0.96 mS/cm, and an ESP of 37%; the experimental field is improved by stirring and discharging as follows:

S101: rotary tillage scarifying, where a soda saline-alkaline paddy field to be treated is scarified by rotary tillage with a depth of 12.5 cm;

S102: irrigation and paddy field soaking, where the soda saline-alkaline paddy field treated in step S101 is irrigated with water and soaked for 7 days, followed by supplementing with water to a thickness of 8 cm before stirring;

S103: slurry stirring, where the slurry of the soda saline-alkaline paddy field is stirred by a driving slurry stirrer in a clockwise direction with a pulling force of 90 kw;

S104: slurry layering, where a container containing sulfuric acid of 50% by mass is mounted on a tractor, and the container is provided with a small hole to allow the sulfuric acid to continuously flow out of the container at a small flow rate; the tractor is started to stir the slurry so as to mix the sulfuric acid into the slurry, where soil powder particles in a suspended slurry layer precipitate rapidly, and soil clay particles remain in the slurry layer in a suspended state because of their smaller particles and stronger dispersibility; the stirring is carried out until most of the powder particles are precipitated and the suspended slurry layer is obviously reduced in terms of viscosity; the sulfuric acid used in this layering step is 80% of a total amount of sulfuric acid of this embodiment, and the total amount is 1 t/hm$^2$;

S105: slurry discharging, where water inlets and water outlets of the paddy field are opened while performing stirring, so that water replenishment and drainage can be carried out at the same time, and the suspended slurry layer is discharged out of the paddy field by using clear water flow; the stirring of the tractor is continued and the sulfuric acid left is sprinkled into the paddy field, where aroused waves are utilized to promote the suspended slurry layer to be discharged from the paddy field, and the tractor is stopped working until the sulfuric acid is all sprinkled into the field; the water inlets are closed until 97% of the suspended slurry layer is discharged, and the water outlets are kept open until the water in the paddy field is completely drained; the water inlets are arranged in a density of 6 inlets per hectare, the water outlets are arranged in a density of 6 outlets per hectare, and the water inlets and the eater outlets are arranged opposite to each other in a staggered manner;

S106 airing, where the field is naturally aired until the water in the paddy field is drained and no slurry sticks to shoes when adults walk normally; and S107: water storing, the field is watered until saturation with water of 1.5 cm 2 days before transplanting rice seedlings after the field is drained and naturally aired.

The yield of the present embodiment is measured in autumn; with improvement of stirring and discharging, the yield of the two-year experimental field is measured to be 6,304 kg/hm².

Comparative Embodiment 2

Figure 1:
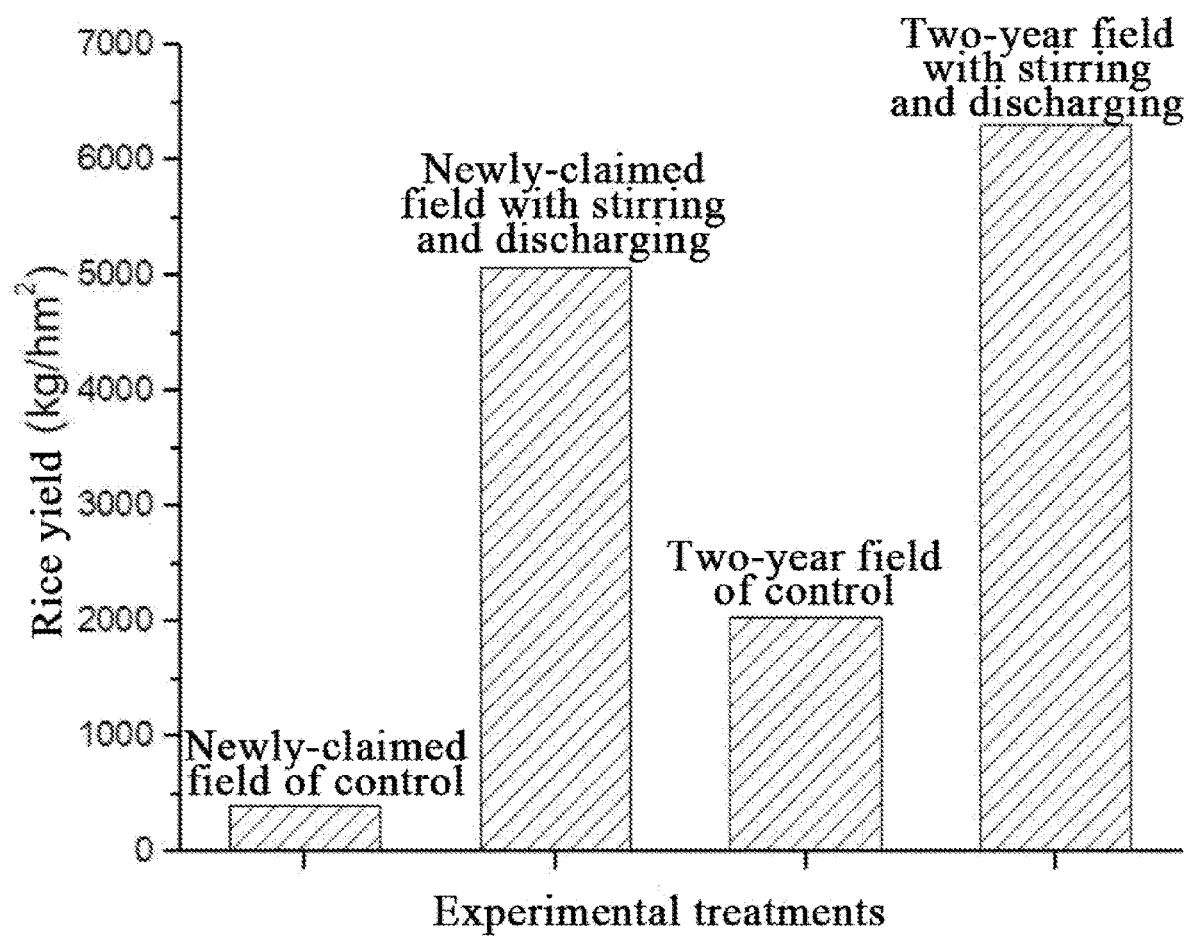
FIG. 1 shows a comparison of embodiments and comparative embodiments of the present disclosure in terms of yield, where newly-reclaimed field of control shows the yield of Comparative embodiment 1, newly-reclaimed field with stirring and discharging shows the yield of Embodiment 1, two-year field of control shows the yield of Comparative embodiment 2, and two-year field with stirring and discharging shows the yield of Embodiment 2.

The present comparative embodiment is arranged with a two-year experimental paddy field in Dagangzi Town, Da'an City, Jilin Province, with rice planted directly in a previous year, a topsoil pH of 10.43, an electrical conductivity of 0.96 mS/cm, and an ESP of 37%; the field is directly planted with rice without improvement of stirring and discharging; it is measured in terms of yield in autumn, with yield being only 2,042 kg/hm². See FIG. 1 for a comparison of the yields of the embodiments and comparative embodiments of the present disclosure.

Any numerical value mentioned in the present disclosure, if there is only an interval of two units between any lowest value and any highest value, includes all values increased by one unit each time from the lowest value to the highest value. For example, if it is stated that the amount of a component or the value of process variables such as temperature, pressure, time, etc., is 50-90, in this specification it means that the values of 51-89, 52-88 . . . , and 69-71 and 70-71 are specifically listed. For non-integer values, the unit of 0.1, 0.01, 0.001 or 0.0001 can be appropriately considered. These are just some specific examples. In this application, in a similar way, all possible combinations of numerical values between the lowest and highest values listed are considered to have been disclosed.

It should be noted that the above-mentioned embodiments are only used to explain the present disclosure, and do not constitute any restrictions on the present disclosure. The disclosure has been described with reference to typical embodiments, but it should be understood that the words used therein are descriptive and explanatory words, not restrictive words. According to regulations, the disclosure can be modified within the scope of the claims of the disclosure, and the disclosure can be modified without departing from the scope and spirit of the disclosure. Although the disclosure described herein relates to specific methods, materials and embodiments, it does not mean that the disclosure is limited to the specific embodiments disclosed therein. On the contrary, the disclosure can be extended to all other methods and applications with the same functions.

What is claimed is:

1. A method for improving paddy fields by stirring and discharging slurry, comprising:

S101: rotary tillage scarifying, where a soda saline-alkaline paddy field to be treated is scarified by rotary tillage with a depth of 11-14 centimeters (cm);

S102: irrigation and paddy field soaking, where the soda saline-alkaline paddy field treated in the S101 is irrigated with water and soaked for 3-7 days, followed by supplementing with water to a thickness of 7 cm-10 cm before stirring;

S103: slurry stirring, where the slurry of the soda saline-alkaline paddy field is stirred in a clockwise or counterclockwise direction;

S104: slurry layering, where a container containing 30 percent (%)-50% sulfuric acid by mass is mounted on a tractor, and the container is provided with a hole to allow the sulfuric acid to continuously flow out of the container at a flow rate; the tractor is started to stir the slurry so as to mix the sulfuric acid into the slurry, where soil powder particles in a suspended slurry layer precipitate, and soil clay particles remain in the slurry layer in a suspended state because of their smaller particles and stronger dispersibility; the stirring is carried out until powder particles are precipitated and the suspended slurry layer is reduced in terms of viscosity; and the sulfuric acid used in this layering step is 70%-80% of a total amount of sulfuric acid of the method;

S105: slurry discharging, where water inlets and water outlets of the paddy field are opened while performing stirring, so that water replenishment and drainage is carried out at the same time, and the suspended slurry layer is discharged out of the paddy field by using clear water flow; the stirring of the tractor is continued and the sulfuric acid left is sprinkled into the paddy field, where aroused waves are utilized to promote the suspended slurry layer to be discharged from the paddy field, and the tractor is stopped working until the sulfuric acid is all sprinkled into the field; the water inlets are closed until more than 95% of the suspended slurry layer is discharged, and the water outlets are kept open until the water in the paddy field is completely drained;

S106: airing, where airing is carried out when the soda saline-alkaline paddy field to be treated is a newly-reclaimed paddy field or a two-year paddy field, the paddy field is naturally aired until the water in the paddy field is drained and no slurry sticks to shoes when adults walk normally; and the airing is not carried out when the soda saline-alkaline paddy field to be treated is a three-year paddy field; and S107: water storing; for newly-reclaimed soda saline-alkaline paddy field to be treated, the field is watered until saturation with water of about 1 cm-2 cm deep 1 day before transplanting rice seedlings; and, for a two-year soda saline-alkaline paddy field to be treated, the field is watered until saturation with water of about 1 cm-2 cm deep 1-3 days before transplanting rice seedlings; and, for the three-year soda saline-alkaline paddy field to be treated, the field is watered until saturation directly after the slurry discharging of S105 is completed, the field is ready for transplanting.

2. The method for improving paddy fields by stirring and discharging slurry according to claim 1, wherein in the step S101, when the soda saline-alkaline paddy field to be treated is a newly-reclaimed paddy field, the field is subjected to rotary tillage with a depth of 11-12 cm; and, when the soda saline-alkaline paddy field to be treated is a two-year paddy field, the field is subjected to rotary tillage with a depth of 12-13 cm; and when the soda saline-alkaline paddy field to be treated is a three-year paddy field, the field is subjected to rotary tillage with a depth of 13-14 cm.

3. The method for improving paddy fields by stirring and discharging slurry according to claim 1, wherein in the step S103, the slurry is stirred with a pulling force of no less than 80 kilowatts (kw).

4. The method for improving paddy fields by stirring and discharging slurry according to claim 1, wherein the slurry is stirred by a driving slurry stirrer and a vibrating slurry lifter.

5. The method for improving paddy fields by stirring and discharging slurry according to claim 1, wherein in the steps S104 and S105, when the soda saline-alkaline paddy field to be treated is a newly-reclaimed paddy field, the total amount of sulfuric acid is 1.0 ton per hectare ($t/hm^2$)-1.2 $t/hm^2$; and, when the soda saline-alkaline paddy field to be treated is a two-year paddy field, the total amount of sulfuric acid is 0.8 $t/hm^2$-1.0 $t/hm^2$; and, when the soda saline-alkaline paddy field to be treated is a three-year paddy field, the total amount of sulfuric acid is 0.6 $t/hm^2$-0.8 $t/hm^2$.

6. The method for improving paddy fields by stirring and discharging slurry according to claim 1, wherein the water inlets in step S105 are arranged in a density of 4 to 6 inlets per hectare.

7. The method for improving paddy fields by stirring and discharging slurry according to claim 1, wherein the water outlets in step S105 are arranged in a density of 4 to 6 outlets per hectare.

8. The method for improving paddy fields by stirring and discharging slurry according to claim 1, wherein the water inlets and water outlets are arranged opposite to each other in a staggered manner.

9. An application of the method for improving paddy fields by stirring and discharging slurry according to claim 1 in improving saline-alkaline soils.

* * * * *